(12) United States Patent
Wang

(10) Patent No.: US 10,163,048 B2
(45) Date of Patent: Dec. 25, 2018

(54) METHOD AND DEVICE FOR PAGE SYNCHRONIZATION

(71) Applicant: GUANGZHOU UCWEB COMPUTER TECHNOLOGY CO., LTD., Guangzhou (CN)

(72) Inventor: Xiaozhen Wang, Guangzhou (CN)

(73) Assignee: GUANGZHOU UCWEB COMPUTER TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 15/514,254

(22) PCT Filed: Jun. 23, 2015

(86) PCT No.: PCT/CN2015/082117
§ 371 (c)(1),
(2) Date: Mar. 24, 2017

(87) PCT Pub. No.: WO2016/065912
PCT Pub. Date: May 6, 2016

(65) Prior Publication Data
US 2017/0300793 A1 Oct. 19, 2017

(30) Foreign Application Priority Data
Oct. 31, 2014 (CN) .......................... 2014 1 0610117

(51) Int. Cl.
*G06K 19/06* (2006.01)
*G06F 17/00* (2006.01)
*G06F 17/30* (2006.01)

(52) U.S. Cl.
CPC . *G06K 19/06037* (2013.01); *G06F 17/30873* (2013.01); *G06F 17/30879* (2013.01)

(58) Field of Classification Search
USPC ..................... 235/375, 462.01, 462.09, 494, 235/462.08–462.1
See application file for complete search history.

(56) References Cited

U.S. PATENT DOCUMENTS

2007/0145138 A1* 6/2007 Snyder ............... G06K 7/10544
235/462.01
2011/0126130 A1* 5/2011 Lieb ...................... G06F 3/1454
715/753

(Continued)

FOREIGN PATENT DOCUMENTS

CN 102902761 A 1/2013
CN 102917023 A 2/2013

OTHER PUBLICATIONS

The World Intellectual Property Organization (WIPO) International Search Report for PCT/CN2015/082117 dated Sep. 28, 2015 5 Pages.

*Primary Examiner* — Tuyen K Vo
(74) *Attorney, Agent, or Firm* — Anova Law Group, PLLC

(57) ABSTRACT

The present disclosure provides a page synchronization method. The method includes: acquiring and parsing a two-dimensional code to obtain to-be-synchronized page data contained in the two-dimensional code; identifying a page address and page progress information from the to-be-synchronized page data; generating an execution code for indicating the page progress according to the page progress information; loading a page according to the page address; and executing the execution code while loading the page, and displaying the page according to the page progress indicated in the execution code. The disclosed method can solve the problem in the prior art that the page progress cannot be automatically synchronized during page synchronization, and can thus improve the user experience.

18 Claims, 3 Drawing Sheets

(56) References Cited

U.S. PATENT DOCUMENTS

| | | | | |
|---|---|---|---|---|
| 2012/0272148 | A1* | 10/2012 | Strober | H04L 65/60 |
| | | | | 715/716 |
| 2013/0334300 | A1* | 12/2013 | Evans | G06F 17/30017 |
| | | | | 235/375 |
| 2014/0103104 | A1* | 4/2014 | Jover | H04N 21/4126 |
| | | | | 235/375 |
| 2014/0164315 | A1* | 6/2014 | Golshan | G06F 17/30011 |
| | | | | 707/608 |
| 2014/0375746 | A1* | 12/2014 | Schachat | H04N 7/141 |
| | | | | 348/14.01 |
| 2015/0135300 | A1* | 5/2015 | Ford | H04L 67/1097 |
| | | | | 726/11 |
| 2016/0044122 | A1* | 2/2016 | Sandholm | H04W 4/21 |
| | | | | 709/206 |
| 2016/0077422 | A1* | 3/2016 | Wang | G03B 37/04 |
| | | | | 348/38 |
| 2017/0196037 | A1* | 7/2017 | Piqueras Jover | H04W 76/023 |

* cited by examiner

METHOD AND DEVICE FOR PAGE SYNCHRONIZATION

CROSS REFERENCE TO RELATED APPLICATIONS

This application is a national phase of PCT application No. PCT/CN2015/082117, filed on Jun. 23, 2015, which claims priority to Chinese Patent Application No. 201410610117.1, filed on Oct. 31, 2014, the entire contents of all of which are hereby incorporated by reference.

FIELD OF THE DISCLOSURE

The present disclosure relates to the field of mobile internet technology and, more particularly, relates to method and device for page synchronization.

BACKGROUND

Currently, a page can be synchronized between a mobile browser and a PC-terminal browser, or between a mobile browser and a mobile browser, mainly by scanning a two-dimensional code. A sending terminal first generates the two-dimensional code containing a page address. A receiving terminal scans the two-dimensional code to obtain URL information of the shared page and open the page according to the URL information. The emergence of scanning the two-dimensional code brings great convenience for mobile phones to access a page and obviates the inconvenience to manually enter a plurality of strings.

However, such page-sharing method is only used to share a URL between devices, that is, this kind of synchronization amounts to reloading the page in the synchronized browsers. For example, a user may need to look it up on another device after reading a large amount of content on a long page. After the page is synchronized on another device, this device can display the page. However, the page may be displayed on a progress position different from the progress position where the user previously browsed and left. The user has to relocate the last browsed position by dragging or sliding the page, thus causing a lot of inconvenience to the user.

Accordingly, users may desire to directly have page progress synchronization after the page is synchronized.

BRIEF SUMMARY OF THE DISCLOSURE

In view of the above, the present disclosure discloses method and device for page synchronization. The disclosed method and device are directed to solve the problem in the prior art that the page progress cannot be automatically synchronized during page synchronization.

According to one aspect of the present disclosure, the present disclosure provides a page synchronization method. The method includes: acquiring and parsing a two-dimensional code to obtain to-be-synchronized page data contained in the two-dimensional code; identifying a page address and page progress information from the to-be-synchronized page data; generating an execution code for indicating the page progress according to the page progress information; loading a page according to the page address; and executing the execution code while loading the page, and displaying the page according to the page progress indicated in the execution code.

In one or more embodiments of the above aspects, before the page address and the page progress information are identified from the to-be-synchronized page data, the method further includes: determining whether a predetermined field is contained in the to-be-synchronized page data; and when the to-be-synchronized page data are determined to contain the predetermined field, confirming that the page progress information is existent in the to-be-synchronized page data.

In one or more embodiments of the above aspects, when the to-be-synchronized page data contain the predetermined field, information following the predetermined field is determined as the page progress information.

In one or more embodiments of the above aspects, generating the execution code for indicating the page progress according to the page progress information, includes: parsing the page progress information to obtain a page progress information type and a progress value contained in the page progress information, and generating the execution code for indicating the page progress according to the page progress information type and the progress value.

In one or more embodiments of the above aspects, according to the progress information indicated in the execution code, displaying the page includes: when the page progress information is position information, scrolling the page to a position indicated by the progress value for display; and when the page progress information is form information, assigning a value to the form on the page and displaying.

In one or more embodiments of the above aspects, the acquired two-dimensional code generated by a sending terminal according to the following method: obtaining the page address of the page; obtaining the progress information of the page; and converting the page address and the page progress information into the two-dimensional code.

In one or more embodiments of the above aspects, after obtaining the progress information of the page, the method further includes: converting the page progress information into a set format; combining the page address and the page progress information after being converted into the set format into strings; and converting the strings into the two-dimensional code.

According to another aspect of the present disclosure, the present disclosure provides a page synchronization device, including:

a parsing unit, configured for acquiring and then parsing the two-dimensional code to obtain to-be-synchronized page data contained the two-dimensional code; an identifying unit, configured for identifying contained a page address and page progress information from the to-be-synchronized page data; a generating unit, configured for generating the execution code for indicating the page progress according to the page progress information; a loading unit, configured for loading the page according to the page address; and an executing unit, configured for executing the execution code while loading the page and displaying the page according to the page progress indicated in the execution code.

In one or more embodiments of the above aspects, the page synchronization device further includes a determining unit, configured for determining whether a predetermined field is contained in the to-be-synchronized page data, before the page address and the page progress information are identified from the to-be-synchronized page data, and also configured for confirming that the page progress information is existent in the to-be-synchronized page data, when the predetermined field is determined to be contained in the to-be-synchronized page data.

In one or more embodiments of the above aspects, when the predetermined field is contained in the to-be-synchronized page data, the identifying unit determines the information following the predetermined field as the page progress information.

In one or more embodiments of the above aspects, the generating unit includes a parsing module and a generating module, wherein, the parsing module is configured for parsing the page progress information to obtain a page progress information type and a progress value, and the generating module is configured for generating the execution code for indicating the page progress according to the page progress information type and the progress value.

According to another aspect of the present disclosure, the present disclosure provides a terminal device, including the above page synchronization device.

The disclosed method and device are directed to obtain the page address and the page progress information by a secondary parsing of the to-be-synchronized page data contained in the two-dimensional code. A code can be further generated according to the page progress information, and then the code can be executed on the page to achieve synchronization of page progress.

In order to achieve the above and related objects, one or more aspects of the present disclosure include the technical features described in details hereinafter and specifically indicated in claims. Some exemplified aspects of the present disclosure are elaborated in the following description and with reference to the drawings. However, the exemplified aspects of the present disclosure only show some of a variety of modes to apply the principle of the present disclosure. In addition, the present disclosure is intended to include all the aspects and their equivalents.

BRIEF DESCRIPTION OF THE DRAWINGS

By referring to the detailed descriptions of the accompanying drawings, the above and other objectives, features and advantages of the present disclosure will be clearer and easily understood. In the drawings.

DETAILED DESCRIPTION

Various aspects of the present disclosure are described more fully hereinafter. It should be understood that the present disclosure herein may be embodied in many different forms, and any specific structures or functions or both presented throughout this disclosure are only representative. Based on the teachings herein, those skilled in the art should understand that any aspect of the present disclosure may be implemented independently from other aspect(s) of the disclosure. Any two or more aspects of the disclosure may be combined in various ways. For example, an apparatus or a method may be implemented using any number of the aspects set forth herein. In addition, the scope of the disclosure is intended to cover such an apparatus or method which is implemented using other structure, functionality, or structure and functionality besides or other than one or more aspects of the present disclosure. Further, it should be understood that an aspect disclosed herein may be embodied by one or more elements of claims.

Various embodiments of the present disclosure will be described below by reference to the accompanying drawings.

Figure 1:
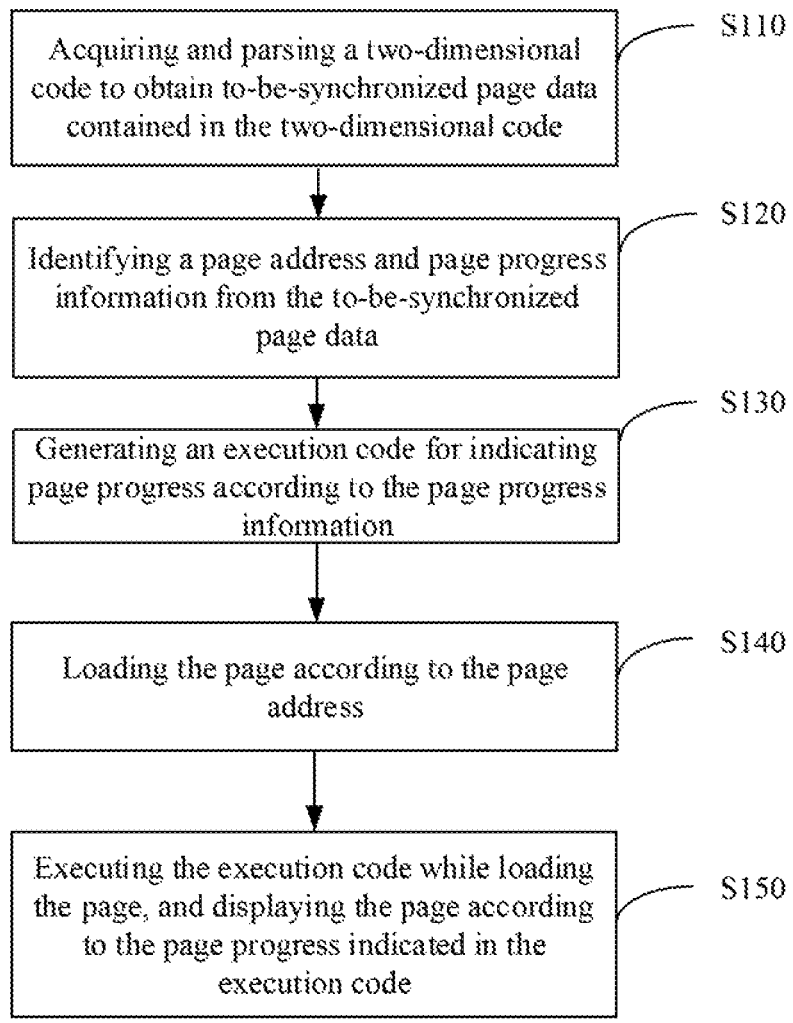
FIG. 1 illustrates a flow chart of an exemplary page synchronization method according to the present disclosure.

FIG. 1 illustrates a flow chart of an exemplary page synchronization method according to the present disclosure.

As shower in FIG. 1, in Step S110, after a two-dimensional code is acquired, the two-dimensional code may be parsed to obtain the to-be-synchronized page data contained in the two-dimensional code.

In one embodiment of the present disclosure, the two-dimensional code may be generated by a sending terminal device having the to-be-synchronized page. When a user browses a page and wants to share current page information to other terminals, a function of sharing the two-dimensional code may be enabled on the current device to generate the two-dimensional code containing the to-be-synchronized page data. A device for receiving the sharing may scan and parse the two-dimensional code to obtain the to-be-synchronized page data contained in the two-dimensional code.

As disclosed herein, the function of sharing the two-dimensional code may be initiated by clicking a function control on the current page. The to-be-synchronized page data may at least include a page address of the to-be-synchronized page. For example, the function of sharing the two-dimensional code may also provide an option allowing the user to select whether page progress information needs to be synchronized. If the user selects "Yes", the page progress information may be added to the two-dimensional code. Generating the two-dimensional code by the sending terminal may include: acquiring the page address of the page; acquiring the progress information of the page; and converting the page address and the page progress information to the two-dimensional code. Specifically, after acquiring the progress information of the page, the process may further include converting the page progress information to a set format, then, combining the page address and the page progress information converted to the set format into strings, and subsequently converting the strings to the two-dimensional code.

Next, in Step S120, the contained page address and page progress information are identified from the to-be-synchronized page data.

In one embodiment of the present disclosure, before the page address and the page progress information are identified from the to-be-synchronized page data, the method may further include: determining whether a predetermined field is contained in the to-be-synchronized page data. If the predetermined field is existent, the page progress information may be regarded to exist in the to-be-synchronized page data. The predetermined field may be a protocol, the information obtained after the two-dimensional code is parsed may be in the form of strings. If the strings parsed from the two-dimensional code contain the field, the two-dimensional code may be regarded to deliver the page progress information.

In one embodiment of the present disclosure, the information following the predetermined field may be determined as the page progress information.

Further, in Step S130, an execution code for indicating the page progress information is generated according to the page progress information.

In one embodiment of the present disclosure, the page progress information may be parsed to obtain a page progress information type and a progress value, the execution code may be generated for indicating the page progress according to the page progress information type and progress value. The execution code may be a JavaScript (JS) code.

In one embodiment of the present disclosure, the page progress information may include various types of information, such as page position information, form information, audio and video playback progress information, and the like. Because it is inconvenient to express different types of information using the same format, a correspondence table between information and format may be predetermined and preset at both client terminals, one for generating the two-dimensional code and the other for parsing the two-dimensional code. Upon being generated, the page progress information may be generated in a predetermined format in the correspondence table. When the progress page is parsed, the page progress information type and the progress value may be determined according to the information format in the correspondence table. Subsequently, a corresponding JS code may be generated according to the page progress information type and progress value. For example, when the page progress information is position information, the generated JS code may be configured for performing a page scrolling operation to scroll the page to the position indicated by the progress value; and when the page progress information is form information, the generated JS code may be configured for performing acquisition of form element and assigning operation.

Further, in Step S140, the page is loaded according to the page address,

In another embodiment of the present disclosure, the page may be loaded according to the page address after the page address is identified from the to-be-synchronized page data.

In Step S150, the execution code is executed while loading the page, and the page is displayed according to the page progress indicated in the execution code.

In another embodiment of the present disclosure, the execution code may be executed in the page loading process after the execution code is generated for indicating the page progress according to the page progress information, thus allowing the page progress of the loaded page to be the same as the page progress of the to-be-synchronized page.

Figure 2:
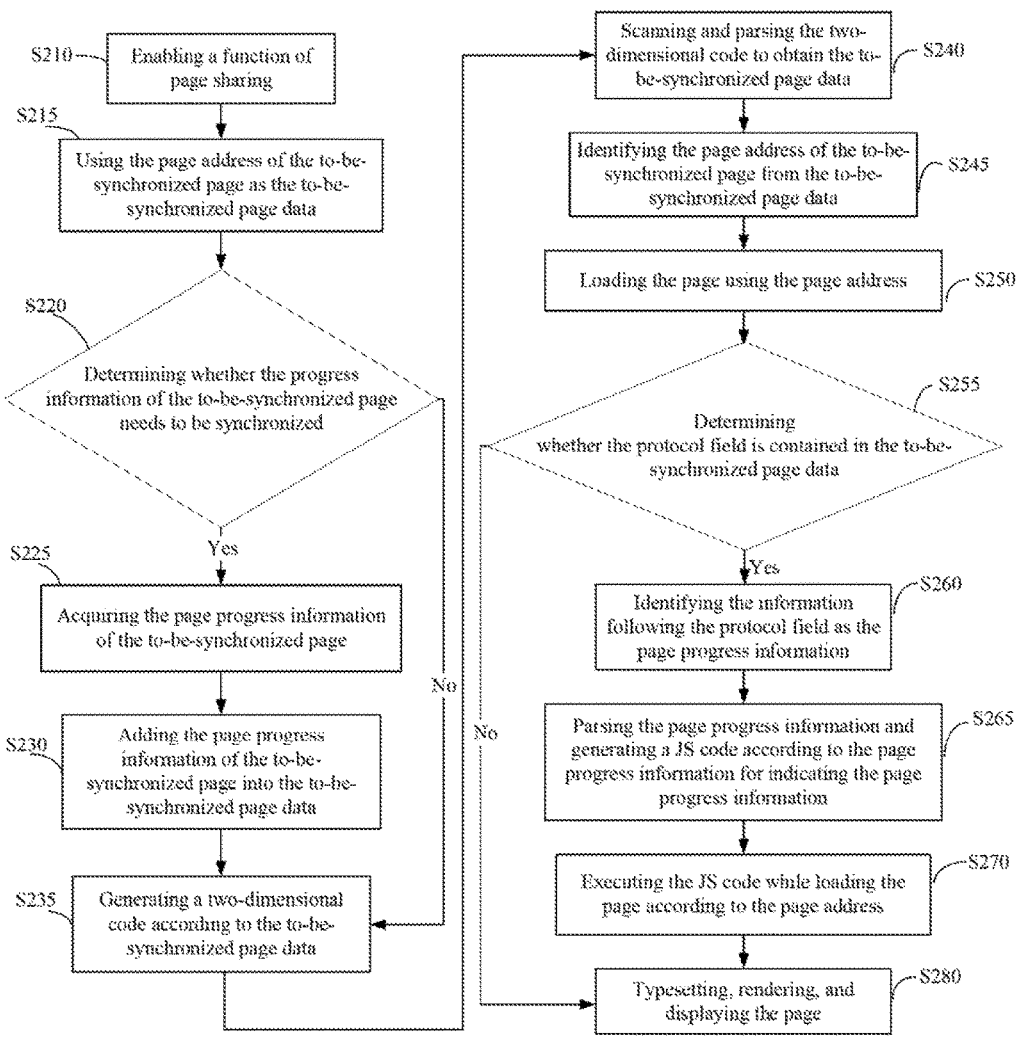
FIG. 2 illustrates a flow chart of another exemplary page synchronization method according to the present disclosure.

FIG. 2 illustrates a flow chart of an exemplary page synchronization method according to the present disclosure.

As shown in FIG. 2, in Step S210, a function of page sharing is enabled. The enabling action may be implemented by clicking a function button for sharing the page on the screen of the current device, when the user of the sending terminal device browses the page on the current device and wants to share the current page to other devices. The current page may become the to-be-synchronized page.

Next, in Step S215, the page address of the to-be-synchronized page is used as the to-be-synchronized page data. Herein, the to-be-synchronized page data may be a plurality of strings, configured for generating the two-dimensional code. For example, when the page address of the to-be-synchronized page is https://a.html, the to-be-synchronized page data may be https://a.html.

Further, in Step S220, it can be determined whether the progress information of the to-be-synchronized page needs to be synchronized. If "Yes", Step S225 will be implemented; If "No", Step S235 will be implemented.

Herein, after the function of page sharing is enabled, a prompt message may be popped up, which prompts the user to select whether the page progress needs to be synchronized. If the user selects "Yes", the page progress may be synchronized, and if the user selects "No", only the page address may be synchronized.

In Step S225, the page progress information of the to-be-synchronized page is acquired. The page progress information may include various types of information, including the display position of the page, the audio and video playback progress on the page, and the like. There may be one or more types of page progress information on one page. The current page display position may be represented by using coordinates.

In Step S230, the page progress information of the to-be-synchronized page is added to the to-be-synchronized page data. When the page progress information needs to be added to the to-be-synchronized page data, a protocol field may be added to the to-be-synchronized page data for indicating that the to-be-synchronized page data contain the page progress information, and also for indicating the position of the page progress information in the to-be-synchronized page data. In one embodiment of the present disclosure, the page progress information may be placed behind the protocol field.

For example, when the page address of the to-be-synchronized page is https://a.html, the page progress information is the display position information, the coordinates are (100, 100), and the protocol field is UCQR, the to-be-synchronized page data may become https://a.html&UCQR:x=100&y=100.

In Step S235, a two-dimensional code is generated according to the to-be-synchronized page data.

It should be noted that the process of generating the two-dimensional code for sharing the page is described in Steps S210 to S235, which are performed by the sending terminal. The subsequent Steps S240 to S280 will describe the process of implementing the page synchronization using the two-dimensional code at the receiving terminal.

In Step S240, the two-dimensional code is scanned and parsed to obtain the to-be-synchronized page data. After the two-dimensional code is parsed, a plurality of strings generating the two-dimensional code may be obtained.

In Step S245, the page address of the to-be-synchronized page is identified from the to-be-synchronized page data In Step S250, the page is loaded using the page address.

In Step S255, it can be determined whether the protocol field is contained in the to-be-synchronized page data. That is, determining whether a "UCQR" is existent. If "Yes", Step S260 will be implemented, and if "No", Step S280 will be implemented to typeset, render, and display the page.

In Step S260, the information following the protocol field is identified as the page progress information. For example, in the to-be-synchronized page data, (i.e., https://a.html&UCQR:x=100&y=100), the page progress information is x=100&y=100.

Next, in Step S265, the page progress information is parsed, and a JS code is generated for indicating the page progress information according to the page progress information. For example, when the page progress information is x=100&y=100, by using the preset correspondence table between information and format, the page progress information is parsed to indicate the position information, showing the progress value is the page coordinates (100, 100). The corresponding JS code generated may be configured for performing a scrolling operation of the page, and allowing the page to be scrolled to the coordinates (100, 100).

Further, in Step S270, the JS code is executed while loading the page according to the page address. When the page progress information is x=100&y=100, after the page is embedded with the JS code, the JS code is automatically executed to scroll the page to the position of the coordinates (100, 100).

In Step S280, the page is typeset, rendered, and displayed.

Figure 3:
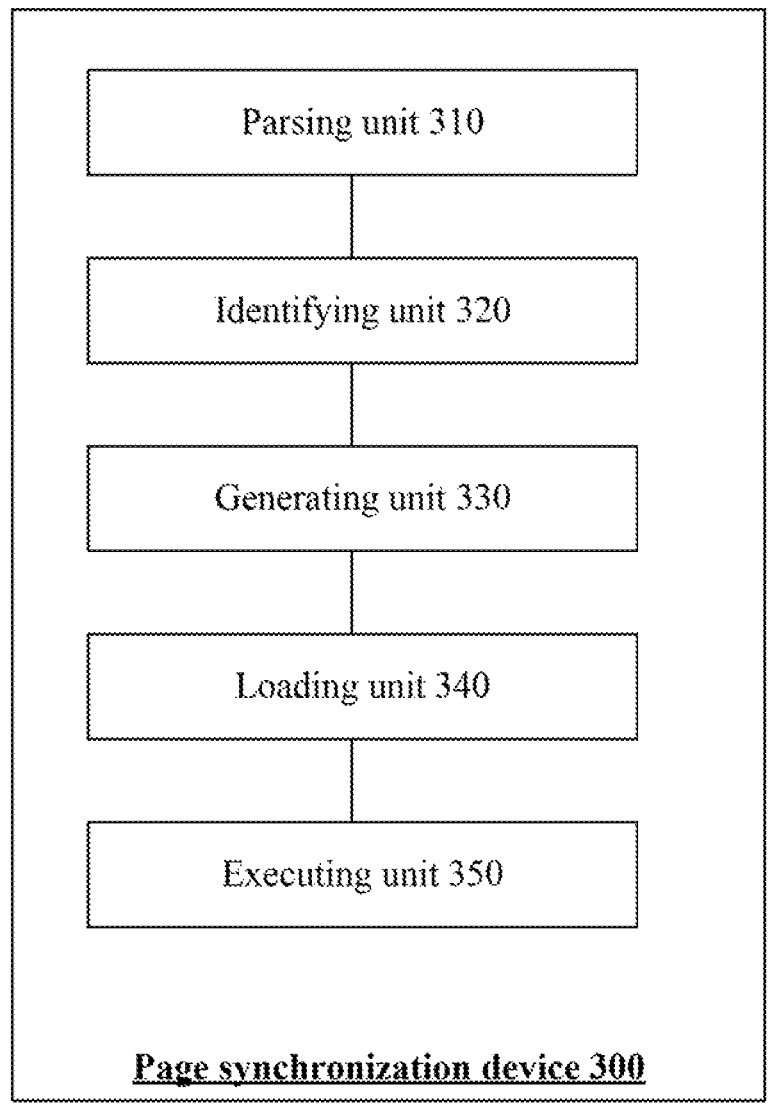
FIG. 3 illustrates a schematic block diagram of an exemplary page synchronization device of the present disclosure.

FIG. 3 illustrates a schematic block diagram of an exemplary page synchronization device according to the present disclosure.

As shown in FIG. 3, the page synchronization device 300 may include a parsing unit 310, an identifying unit 320, a generating unit 330, a loading unit 340, and an executing unit 350.

The parsing unit 310 may be configured for obtaining the to-be-synchronized page data contained in the two-dimensional code, after the two-dimensional code is acquired and parsed. The identifying unit 320 may be configured for identifying the contained page address and page progress information from the to-be-synchronized page data. The generating unit 330 may be configured for generating the execution code according to the page progress information for indicating the page progress. The loading unit 340 may be configured for loading the page according to the page address. The executing unit 350 may be configured for executing the execution code while loading the page, and display the page according to the page progress indicated in the execution code.

In one or more embodiments of the above aspects, the page synchronization device 300 may further include a determining unit (not shown in FIG. 3), configured for determining whether the predetermined field is contained in the to-be-synchronized page data, before the page address and the page progress information are identified from the to-be-synchronized page data, and also configured for confirming that the page progress information is existent in the to-be-synchronized page data, when the predetermined field is determined to be contained in the to-be-synchronized page data.

In various embodiments, optionally, when the predetermined field is contained in the to-be-synchronized page data, the identifying unit 320 may determine the information following the predetermined field as the page progress information.

In various embodiments, optionally, the generating unit 330 may include a parsing module and a generating module (not shown in FIG. 3), wherein the parsing unit may be configured for parsing the page progress information to obtain the page progress information type and the progress value, and the generating module may be configured for generating the execution code for indicating the page progress according to the page progress information type and progress value.

According to another aspect of the present disclosure, the present disclosure provides a terminal device, including the above page synchronization device 300.

In addition, the present disclosure also discloses a terminal device, including the page synchronization device 300 as illustrated in FIG. 3.

Furthermore, the present disclosure also discloses a terminal device, including: a memory, configured for storing computer program instructions to implement the method illustrated in FIG. 1; a processor, coupled with the memory, and configured to execute the computer program instructions stored on the memory.

Furthermore, the method according to the present disclosure may also be implemented as computer program, executed by the processor (e.g. CPU) of mobile terminals and stored in the memory of mobile terminals. When the computer program is executed by the CPU, the above functions defined in the method of the present disclosure are performed.

In addition, the method according to the present disclosure may also be implemented as a computer program product, which may include a computer-readable storage device for storing the computer program configured to perform the above functions defined in the method of the present disclosure.

Furthermore, the above steps in the method and units in the system may also be realized by using a controller and the computer-readable storage device that stores the computer program for causing the controller to achieve the steps or unit functions.

The person skilled in the art should also understand that the various illustrative logical blocks, modules, circuits and algorithm steps described in combination with the contents disclosed herein may be implemented as an electronic hardware, computer software or a combination thereof. In order to clearly explain the interchangeability between the hardware and the software, a general description has been given in terms of the functions of various illustrative components, blocks, modules, circuits and steps. These functions are implemented as the software or implemented as the hardware depending on the particular applications and the design constraints imposed to the whole system.

Although the above disclosure illustrates exemplary embodiments of the present disclosure, it should be noted, however, various changes and modifications may be made without departing from the scope of the present disclosure defined in the claims. According to the methods illustrated in the embodiments of the present disclosure, the functions, steps and/or actions in the claim are not required to be executed in a particular order. In addition, although the elements of the present disclosure may be described or requested individually, they may also be assumed to be plural, unless they are clearly limited to a single number.

Although the present disclosure has been disclosed together with the preferred embodiments which is shown and described in detail, those skilled in the art should understand that various improvements can be made to the above described embodiments, without departing from the contents of the present disclosure. Therefore, the scope of the present disclosure should be determined by the claims.

What is claimed is:

1. A page synchronization method, comprising:
   acquiring and parsing, by a first device, a two-dimensional code generated by a second device to obtain to-be-synchronized page data, including a page address and a page progress information of a page, contained in the two-dimensional code;
   identifying, by a first device, the page address and the page progress information including a progress value from the to-be-synchronized page data;
   generating, by the first device, an execution code indicating a page progress based on the progress value on the page to pick up the page at where the page is previously browsed on the second device, according to the page progress information;
   loading, by the first device, the page according to the page address; and
   executing, by the first device, the execution code while loading the page, and displaying the page according to the page progress indicated in the execution code.

2. The method according to claim 1, wherein:
before identifying the page address and the page progress information from the to-be-synchronized page data, the method further includes:
determining whether a predetermined field is contained in the to-be-synchronized page data; and
when the to-be-synchronized page data are determined to contain the predetermined field, confirming that the page progress information is existent in the to-be-synchronized page data.

3. The method according to claim 2, wherein:
when the to-be-synchronized page data contain the predetermined field, information following the predetermined field is determined as the page progress information.

4. The method according to claim 1, wherein:
the page progress information includes a page progress information type having a corresponding progress value, and
generating the execution code for indicating the page progress according to the page progress information, comprises:
parsing the page progress information to obtain the page progress information type and the progress value contained in the page progress information, and
generating the execution code for indicating the page progress according to the page progress information type and the progress value.

5. The method according to claim 4, wherein:
the page progress information type includes position information and form information, and
displaying the page, according to the progress information indicated in the execution code, includes:
when the page progress information is the position information, scrolling the page to a position indicated by the progress value for display; and
when the page progress information is the form information, assigning a value as the progress value to the form on the page and displaying.

6. The method according to claim 1, wherein:
the two-dimensional code is generated by the second device as following:
obtaining the page address of the page;
obtaining the page progress information of the page; and
converting the page address and the page progress information into the two-dimensional code.

7. The method according to claim 6, after obtaining the page progress information of the page, further including:
converting the page progress information into a set format;
combining the page address and the page progress information after being converted into the set format into strings; and
converting the strings into the two-dimensional code.

8. A terminal device, comprising:
a memory, configured for storing computer program instructions to implement a page synchronization method;
a processor, coupled with the memory, and, when executing the computer program instructions, configured for:
acquiring and parsing a two-dimensional code generated by another device to obtain to-be-synchronized page data, including a page address and a page progress information of a page, contained in the two-dimensional code;
identifying the page address and the page progress information including a progress value from the to-be-synchronized page data;
generating an execution code indicating a page progress based on the progress value on the page to pick up the page at where the page is previously browsed on another device, according to the page progress information;
loading the page according to the page address; and
executing the execution code while loading the page and displaying the page according to the page progress indicated in the execution code.

9. The device according to claim 8, wherein the processor is further configured for:
determining whether a predetermined field is contained in the to-be-synchronized page data, before the page address and the page progress information are identified from the to-be-synchronized page data, and also confirming that the page progress information is existent in the to-be-synchronized page data, when the predetermined field is determined to be contained in the to-be-synchronized page data.

10. The device according to claim 9, wherein:
when the predetermined field is contained in the to-be-synchronized page data, the processor determines the information following the predetermined field as the page progress information.

11. The device according to claim 8, wherein:
the page progress information includes a page progress information type having a corresponding progress value, and
the processor is further configured for:
parsing the page progress information to obtain the page progress information type and the progress value, and generating the execution code for indicating the page progress according to the page progress information type and the progress value.

12. A computer-readable storage device, having a program stored thereon, wherein when being executed, the program causes a processor to perform a page synchronization method, the method comprising:
acquiring and parsing a two-dimensional code generated by a sending terminal to obtain to-be-synchronized page data, including a page address and a page progress information of a page, contained in the two-dimensional code;
identifying the page address and the page progress information including a progress value from the to-be-synchronized page data;
generating an execution code indicating a page progress based on the progress value on the page to pick up the page at where the page is previously browsed on the sending terminal, according to the page progress information;
loading the page according to the page address; and
executing the execution code while loading the page, and displaying the page according to the page progress indicated in the execution code.

13. The device according to claim 12, wherein:
before the page address and the page progress information are identified from the to-be-synchronized page data, the method further includes:
determining whether a predetermined field is contained in the to-be-synchronized page data; and
when the to-be-synchronized page data are determined to contain the predetermined field, confirming that the page progress information is existent in the to-be-synchronized page data.

14. The device according to claim 13, wherein:
when the to-be-synchronized page data contain the predetermined field, information following the predetermined field is determined as the page progress information.

15. The device according to claim 12, wherein:
the page progress information includes a page progress information type having a corresponding progress value, and
generating the execution code for indicating the page progress according to the page progress information, comprises:
parsing the page progress information to obtain the page progress information type and the progress value contained in the page progress information, and
generating the execution code for indicating the page progress according to the page progress information type and the progress value.

16. The device according to claim 15, wherein:
the page progress information type includes position information and form information, and
displaying the page, according to the progress information indicated in the execution code, includes:
when the page progress information is the position information, scrolling the page to a position indicated by the progress value for display; and
when the page progress information is the form information, assigning a value as the progress value to the form on the page and displaying.

17. The device according to claim 12, wherein:
the two-dimensional code is generated according to a method including:
obtaining the page address of the page;
obtaining the page progress information of the page; and
converting the page address and the page progress information into the two-dimensional code.

18. The device according to claim 17, after obtaining the page progress information of the page, further including:
converting the page progress information into a set format;
combining the page address and the page progress information after being converted into the set format into strings; and
converting the strings into the two-dimensional code.

* * * * *